United States Patent
Shijo et al.

[11] Patent Number: 5,937,528
[45] Date of Patent: Aug. 17, 1999

[54] TILT SENSOR, MASK AND COAT HOLDER

[75] Inventors: Yoshihisa Shijo; Takanobu Shiokawa; Teruo Sakai; Yuko Ochiai; Hiroaki Fuse; Hiroshi Sone, all of Tokyo, Japan

[73] Assignee: Asahi Kogaku Kogyo Kabushiki Kaisha, Tokyo, Japan

[21] Appl. No.: 08/899,816

[22] Filed: Jul. 24, 1997

[30] Foreign Application Priority Data

Jul. 25, 1996 [JP] Japan .................................. 8-196316P

[51] Int. Cl.⁶ ...................................................... G01C 9/06
[52] U.S. Cl. ............................ 33/366.21; 33/370; 33/390
[58] Field of Search ............................ 33/366.12, 366.15, 33/366.18, 366.19, 366.21, 366.22, 366.26, 370, 371, 384, 385, 390

[56] References Cited

U.S. PATENT DOCUMENTS

| | | | |
|---|---|---|---|
| 1,853,558 | 4/1932 | Fullman | 33/390 |
| 2,338,811 | 1/1944 | Hasbrook | 33/366.22 |
| 2,356,311 | 8/1944 | Geier | 33/390 |
| 2,452,930 | 11/1948 | Ivey | 33/390 |
| 2,713,726 | 7/1955 | Dixson | 33/366.21 |
| 2,806,296 | 9/1957 | Weichert | 33/390 |
| 3,916,531 | 11/1975 | Morton | 33/390 |
| 4,583,296 | 4/1986 | Dell'Acqua | 33/366.22 |
| 5,180,986 | 1/1993 | Swartz et al. | 33/366.12 |
| 5,351,539 | 10/1994 | Ziegenbein et al. | 33/366.21 |

FOREIGN PATENT DOCUMENTS 7146142  6/1995  Japan .

*Primary Examiner*—G. Bradley Bennett
*Attorney, Agent, or Firm*—Greenblum & Bernstein, P.L.C.

[57] ABSTRACT

In a tilt sensor including a sealed container which is comprised of a container body and a top cover plate which is adapted to close the container body and is provided on the inner surface thereof with a recess whose depth gradually increases from the peripheral edge toward the center thereof, and a holder which holds the sealed container, the top cover plate and the holder are provided with a positioning device which determines a relative angular position between the sealed container and the holder. A mask and a coat holder, which are used to form electrodes on the top cover plate are also disclosed.

11 Claims, 7 Drawing Sheets

TILT SENSOR, MASK AND COAT HOLDER

BACKGROUND OF THE INVENTION

1. Field of the Invention

The present invention relates to a tilt sensor (tiltmeter) in which the position of an air bubble enclosed in a sealed container is measured to detect a tilt angle of the sealed container, and a mask and a coat holder, which are adapted to form two electrodes on an upper plate which constitutes the sealed container.

2. Description of the Related Art

In general, a tilt sensor is provided in survey instruments, aircraft, or automobiles, etc., to measure a tilt angle thereof, wherein the position of an air bubble contained in a liquid enclosed in a sealed container is electrically detected.

The assignee of the present application has proposed a tilt sensor in which the sealed container is comprised of a top cover plate (an upper end plate) which is provided on one surface thereof with a recess whose bottom surface is made of a toroidal surface (i.e., a curved surface having different curvatures in two orthogonal directions at the center thereof), a cylindrical body, and a bottom plate to relax the mounting precision of the tilt sensor in a direction perpendicular to a direction (tilt angle detection direction) in which the tilt angle is detected (Japanese Patent Application No. 8-105834) and counterpart U.S. application Ser. No. 08/840,074, filed Apr. 24, 1997, entitled "Tilt Sensor".

In the tilt sensor proposed in JPA '834, the toroidal surface of the top cover plate is formed such that the curvature in the tilt angle detection direction is smaller than the curvature in the direction perpendicular thereto. A pair of upper electrodes made of a platinum coating are provided on the toroidal surface in a line-symmetry arrangement with respect to the center line which extends in the direction perpendicular to the tilt angle detection direction.

The top cover plate constitutes the sealed container in which the electrolyte containing an air bubble, together with the bottom plate on which the upper electrodes are formed and the cylindrical body. The sealed container is immovably hung from a holder which forms a housing of the tilt sensor. The sealed container is positioned so that the tilt angle detection direction of the top cover plate is identical to the inclination angle detection angle of the tilt sensor. The holder is closed by a cover to complete the tilt sensor.

In the proposed tilt sensor, if a side surface of an object to which the tilt sensor is to be attached to detect the tilt angle does not lie in the vertical plane, the air bubble is moved away from the inner wall of the cylindrical body and hence the precise measurement of the tilt angle can be carried out.

The upper electrodes provided on the toroidal surface are made of a platinum thin layer deposited thereon by high-frequency sputtering, using a predetermined shape of mask on the toroidal surface. The portions of the mask corresponding to the upper electrodes must be juxtaposed in the tilt angle detection direction of the top cover plate. Otherwise, the curvature of the toroidal surface in the direction in which the upper electrodes formed using the mask are juxtaposed is not identical to the value on design, thus resulting in a variation in the displacement of the air bubble depending on the inclination of the sealed container. Thus, the tilt angle detection sensitivity (output/tilt angle) becomes irregular.

The positioning operation to precisely determine the position of the mask relative to the top cover plate so that the portions of the mask that correspond to the upper electrodes are juxtaposed in the tilt angle detection direction is cumbersome. Moreover, even if the mask is precisely positioned relative to the top cover plate, there is a possibility that the upper electrodes fail to be formed at correct positions, due to accidental movement of the mask during the formation of the electrodes.

In addition to the foregoing, if the upper electrodes are formed on the toroidal surface of the top cover plate at predetermined positions, a failure to connect the sealed container including the top cover plate to the holder in place results in a deviation of the curvature of the toroidal surface in the tilt angle detection direction of the tilt sensor from the design value or results in a variation in the contact surface area of the air bubble with the upper electrodes when the inclination of the tilt sensor occurs in the direction perpendicular to the tilt angle detection direction. However, the positioning operation of the sealed container which must rely upon the measurement with the operator's eyes is considerably troublesome, thus resulting in a low productivity of the tilt sensors.

SUMMARY OF THE INVENTION

It is an object of the present invention to provide a tilt sensor in which a sealed container can be precisely placed with respect to a holder.

Another object of the present invention is to provide a mask which can be superimposed on a top cover plate to form two electrodes thereon in a correct positional relationship therebetween.

Yet another object of the present invention is to provide a coat holder which can hold the top cover plate and the mask in a predetermined positional relationship when the electrodes are formed.

To achieve the first-mentioned object of the invention, according to the present invention, there is provided a tilt sensor comprising a container body that comprises a top cover plate which is adapted to close the container body and is provided with a recess on one end surface opposed to the container body, the depth of the recess gradually increasing from the peripheral edge toward the center thereof. Additionally there is provided a liquid enclosure containing an air bubble, enclosed in the container body, and which is held by a holder which holds the container and is secured to an object for which the inclination angle is to be measured. In addition there is a means for positioning the top cover plate and the holder while keeping a predetermined relative angular relationship therebetween.

The recessed surface of the top cover plate can be made of a toroidal surface (i.e., a curved surface having different curvatures in two orthogonal directions) or an aspherical surface such as a quadric surface. Alternatively, the recessed surface of the top cover plate may be made of a curved surface defined by a part of a torus or a spherical surface.

To achieve the second object of the invention, according to another aspect of the present invention, there is provided a mask which is used to form two electrodes on a top cover plate of a tilt sensor by sputtering conductive particles through the mask while superimposing the mask onto the top cover plate, the top cover plate being provided with a recessed surface having different curvatures in two orthogonal directions on which the two electrodes are formed, wherein the top cover plate is provided with a first indication mark which represents the direction of one of the curvatures, and wherein the mask is provided a second indication mark which is flush with the first indication mark when the recessed surface of the top cover plate and the mask are located in a predetermined positional relationship.

To achieve the third object of the invention, according to still another aspect of the present invention, there is provided a coat holder which holds a top cover plate of a tilt sensor and a mask to form two electrodes on a recessed surface of the top cover plate by sputtering conductive particles through the mask while superimposing the mask onto the top cover plate, the recessed surface having different curvatures in two orthogonal directions, wherein the top cover plate and the mask are provided with non-cylindrical peripheral surfaces which are flush, when the mask is superimposed on the top cover plate.

Additionally, the holder is provided with a fitting portion in which the outer peripheral surface of the top cover plate and the outer peripheral surface of the mask are fitted so that the top cover plate and the mask maintain a relative angular positional relationship therebetween, wherein the top cover plate is provided on the outer peripheral surface thereof with a first indication plane, and the mask is provided with a second indication plane which is flush with the first indication plane when the mask is superimposed on the top cover plate, and wherein the coat holder is provided with a reference plane which comes into close contact with the first indication plane of the top cover plate and the second indication plane of the mask to determine a relative position between the top cover plate and the mask.

The present disclosure relates to subject matter contained in Japanese Patent Application No. HEI 08-196316 (filed on Jul. 25, 1996) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Mechanical Structure of Tilt Sensor

Figure 1:
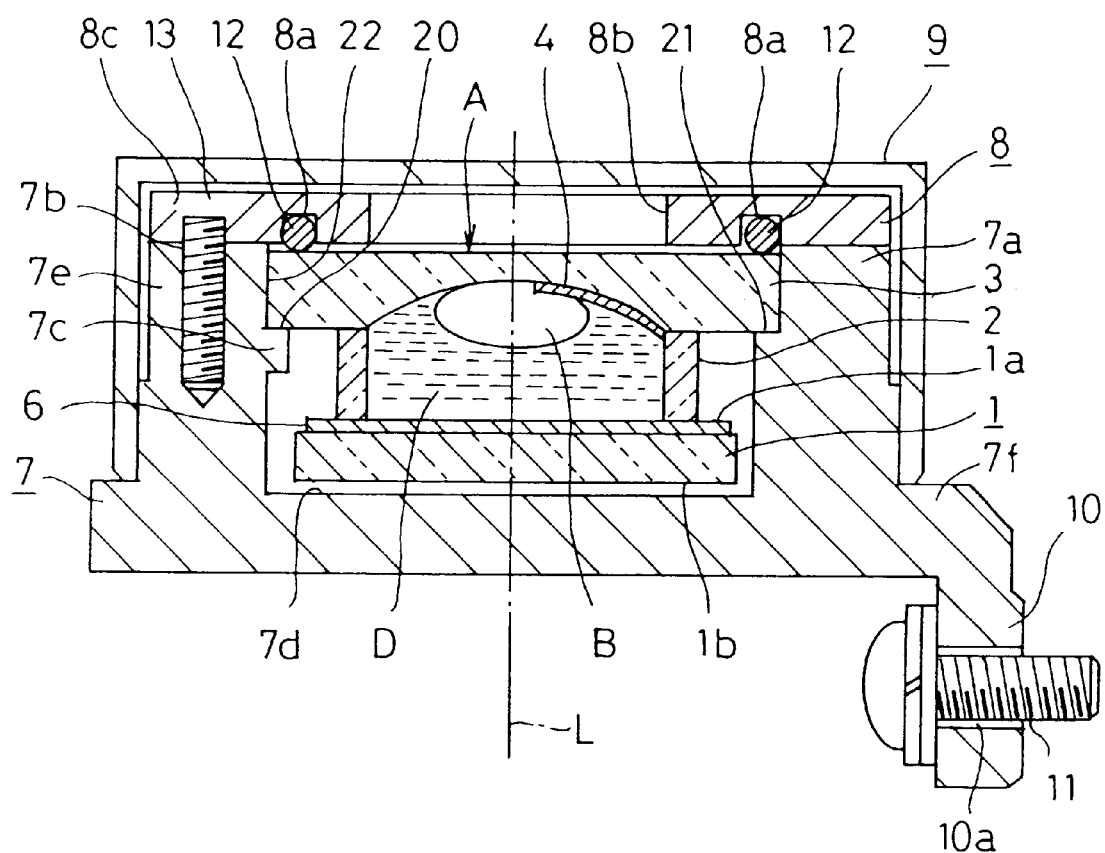
FIG. 1 is a sectional view of a tilt sensor taken along the line I—I in FIG. 2, according to a first embodiment of the present invention.
Figure 2:
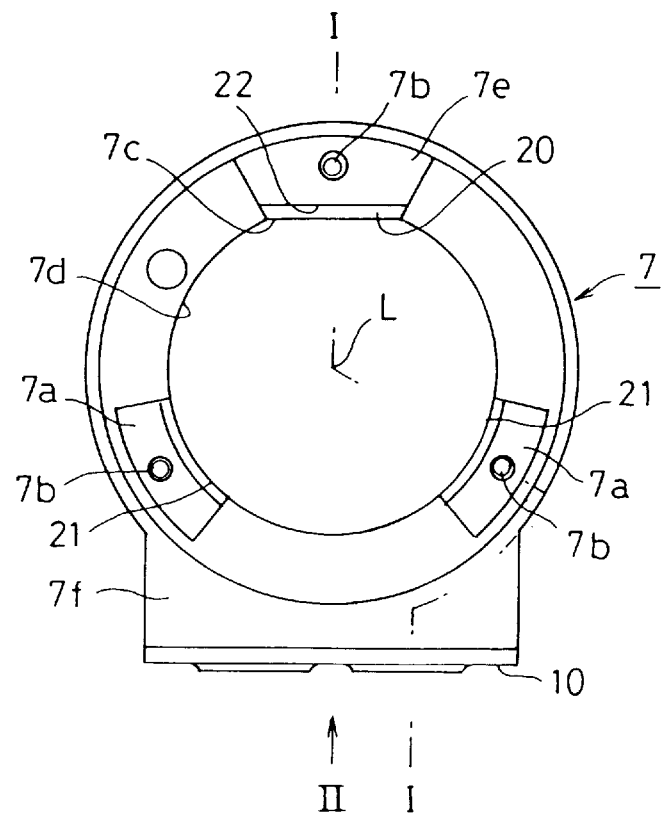
FIG. 2 is a plan view of a holder in a tilt sensor shown in FIG. 1.
Figure 3:
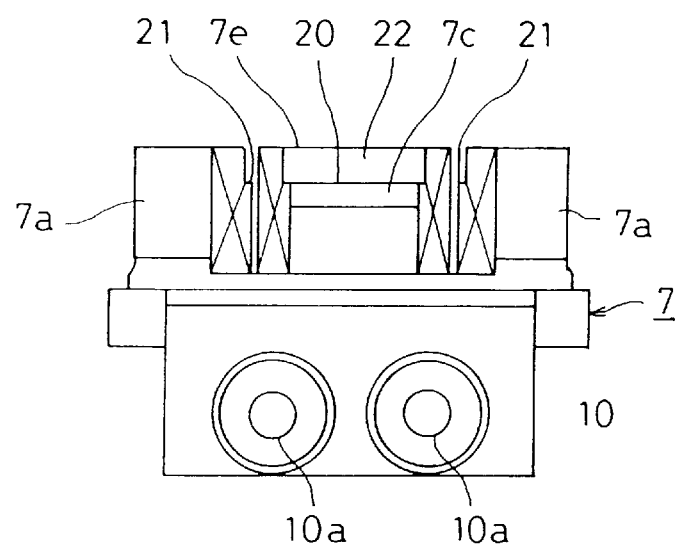
FIG. 3 is a view of a holder of a sealed container, viewed from direction II in FIG. 2.

As can be seen in FIGS. 1 through 3, a tilt sensor is composed of a sealed container "A", a holder 7 which holds therein the sealed container "A", a lid 8 which closes the holder 7 and presses the sealed container "A" against the holder 7, and a cover 9 which covers the holder 7 and the lid 8. These elements will be discussed below.

(Sealed Container)

The sealed container "A" comprises a cylindrical body 2, a top cover plate (upper end plate) 3 and a bottom plate 1, secured to the upper and lower ends of the cylindrical body 2, respectively. The cylindrical body 2, the top cover plate 3 and the bottom plate 1 are made of a highly insulating material, such as lead glass, and are adhered by means of ah adhesive, such as, for example, a glass paste in a liquid tight fashion.

Figure 4A:
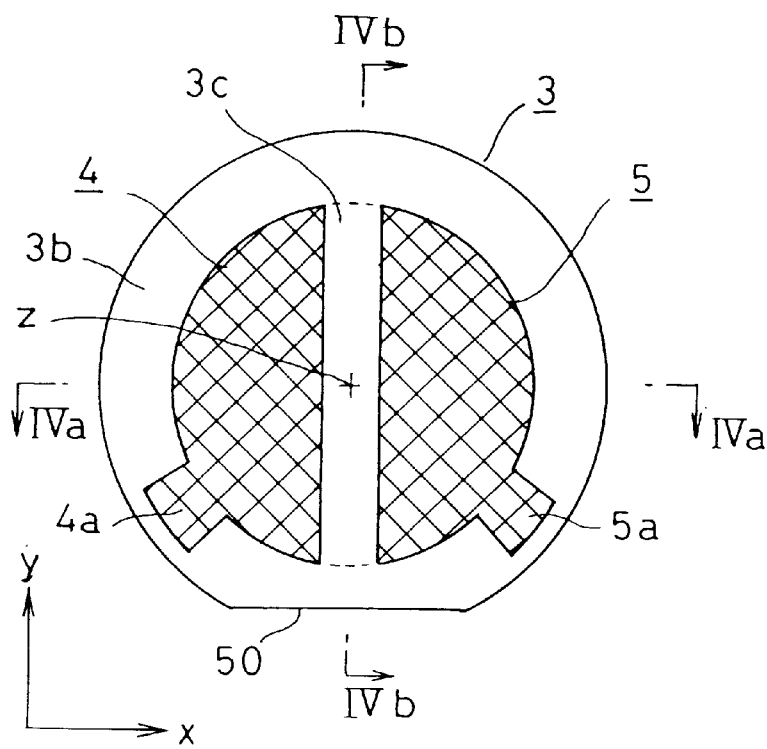
FIGS. 4a, 4b and 4c are a plan view of a top cover plate (top cover plate) shown in FIG. 1, a sectional view taken along line IVb—IVb in FIG. 4a, and a sectional view taken along line IVc—IVc in FIG. 4a, respectively.
Figure 4B:
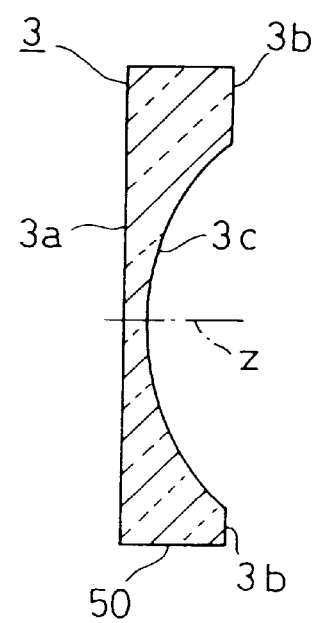
Figure 4C:
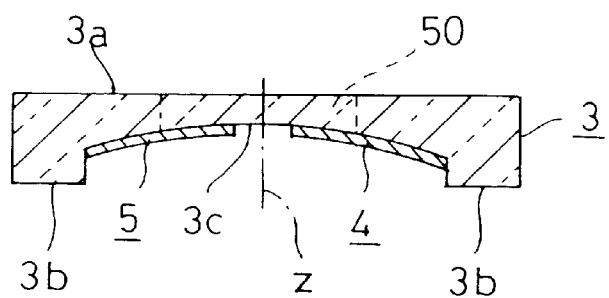

As can be seen in FIGS. 4a through 4c, the top cover plate 3 is made of a transparent plate in the form of a generally circular disc, which is provided with a planar upper surface 3a and a lower surface 3b which is provided on the center portion thereof with a recess (concave surface) 3c. The peripheral surface of the top cover plate is defined by a substantially cylindrical surface portion and a partially cutaway portion which defines a first indication plane 50 (first positioning means or first mark). The first indication plane 50 is parallel with the tilt angle detection direction (x in FIG. 4) and perpendicular to the upper surface 3a of the top cover plate 3.

The recess 3c formed on the lower surface 3b of the top cover plate 3 is defined by a toroidal surface having different curvatures in the tilt angle detection direction x in which the tilt angle is detected and the direction y perpendicular to the detection direction x. The centers of the curvatures in the directions x and y are located on the center axis z of the top cover plate 3.

The curvature in the direction x is relatively small so as to enhance the precision in the detection of the tilt angle, as shown in FIG. 4c. The curvature in the direction y is larger than the curvature in the direction x so as to prevent the air bubble "B" from sticking to the inner surface of the cylindrical body 2 if the mounting angle in the direction perpendicular to the detection direction x is slightly different from a predetermined value, as shown in FIG. 4b. For example, the curvatures in the directions x and y are 300 mm and 60 mm, respectively.

The deepest point of a recess 3c is located on the center axis z of the top cover plate 3. An imaginary tangent plane tangential to the recess 3c at the deepest point thereof is parallel with the lower surface 3b of the top cover plate 3. There is a stepped portion in the direction x between the peripheral surface of the recess 3c and the lower surface 3b, as can be seen in FIG. 4c.

The top cover plate 3 is made of a glass mold using a glass preform whose inner surface has been ground by, for example, an approximately #1000 abrasive or the like to have a rough surface with an appropriate roughness. Thus, the concave surface (recess) 3c is formed by a rough surface. The first indication mark 50 is integrally formed by the glass molding process of the top cover plate 3.

The recess 3c of the top cover plate 3 is provided with two upper electrodes (first and second upper electrodes) 4 and 5 made of a platinum thin layer. The electrodes 4 and 5 are arranged in line-symmetry with respect to a bisector of the top cover plate 3 (i.e., the center axis in the direction y) by which the top cover plate 3 is divided into two identical halves in the direction y in FIG. 4a. The electrodes 4 and 5 are spaced from one another at a predetermined distance to define a space therebetween. The peripheral surface of the electrodes 4 and 5 are defined by an arc of a circle which defines the outer peripheral surface of the recess (concave surface) 3c. The electrodes 4 and 5 are provided with projections 4a and 5a that extend outward onto the side wall (peripheral wall) of the recess 3c and spread in the form of a sector over the lower surface 3b.

Figure 6B:
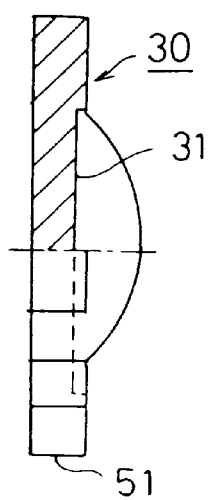
FIGS. 6a and 6b are a plan view of a mask for a top cover plate, and a sectional view taken along the line VIb—VIb in FIG. 6a, respectively.
Figure 6A:
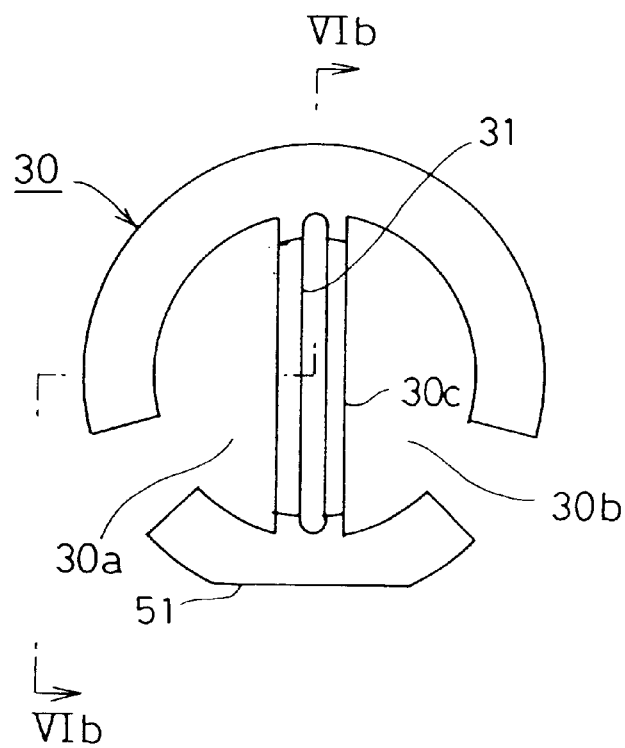

The electrodes 4 and 5 are made of thin platinum layers which are formed by depositing platinum onto the concave surface 3c by high-frequency sputtering. In the high-frequency sputtering, the portions of the recess 3c and the lower surface 3b other than those corresponding to the electrodes 4 and 5 are covered by a mask 30 (FIGS. 6a and 6b). Note that upon assembly of the sealed container "A", lead wires (not shown) are soldered to the projections 4a and 5a of the electrodes 4 and 5 that spread out of the cylindrical body 2.

Figure 5:
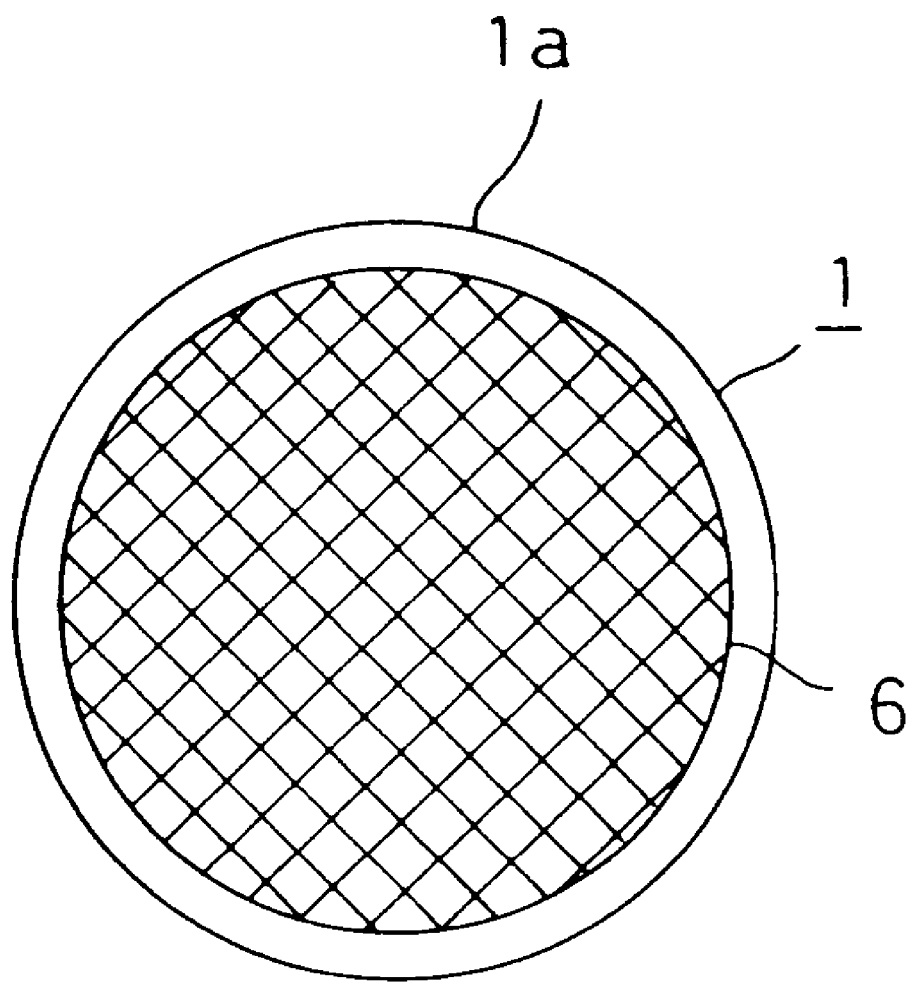
FIG. 5 is a plan view of a bottom plate shown in FIG. 1.

The bottom plate 1 is made of a transparent plate in the form of a disc, as may be seen in FIG. 5. Namely, the upper surface 1a and the lower surface 1b of the bottom plate 1 are parallel with each other. The upper surface 1a of the bottom plate 1 is made of a rough surface having an appropriate roughness, which is formed by grinding the surface using, for example, an approximately #1000 abrasive. The upper surface 1a of the bottom plate 1 constitutes a bottom surface of the sealed container "A" when the latter is assembled.

A lower electrode 6 is provided on the upper surface 1a of the bottom plate 1. The lower electrode 6 is in the form of a circle whose diameter is larger than the outer diameter of the cylindrical body 2 but slightly smaller than the outer diameter of the upper surface 1a. The lower electrode 6 is made of a thin platinum layer which is formed by depositing platinum onto the upper surface 1a by high-frequency sputtering. In the high-frequency sputtering, the portion of the upper surface 1a other than that corresponding to the electrode 6 is covered by a mask, the same as in the formation of the upper electrodes 4 and 5. Note that upon assembly of the sealed container "A", lead wires (not shown) are soldered to the circumferential portion of the lower electrode 6 that spreads out of the cylindrical body 2.

The cylindrical body 2 is made of a glass tube having a uniform thickness. The upper and lower ends of the cylindrical body 2 are cut along planes perpendicular to the longitudinal axis thereof and are coaxially connected to the lower surface 3b of the top cover plate 3 and the upper surface 1a of the bottom plate 1. The inner diameter of the cylindrical body 2 and the outer diameter of the recess 3c of the top cover plate 3 are identical. The cylindrical body 2, the bottom plate 1, and the bottom plate 1 constitute the sealed container.

An electrolytic solution D containing an appropriate amount of air which produces an air bubble B is enclosed in the sealed container "A". The electrolyte D is, for example, a solution of methyl alcohol in which potassium iodide is dissolved. The air bubble B positions at the center of the recess 3c so long as the deepest point of the recess 3c is located at the highest position in the gravitational direction (i.e., the lower surface 3b of the top cover plate 3 lies in a horizontal plane). If the top cover plate 3 is inclined in the direction y in FIG. 4a, the air bubble B is moved in the space provided between the first and second upper electrodes 4 and 5, provided that no inclination of the top cover plate 3 occurs in the direction x.

So long as the tilt angle in the direction y is smaller than a predetermined value (referred to as a first angle) no air bubble "B" comes into contact with the inner wall of the cylindrical body 2 even if the tilt angle in the direction y is above the maximum angle (referred to as a second angle which is smaller than the first angle) which can be detected by the tilt sensor. In this state, if the top cover plate 3 (i.e., the sealed container "A") is inclined in the direction x in FIG. 4a, the air bubble "B" is moved within the recess 3c in the direction x, so long as the inclination angle in the direction x is less than the second angle.

(Holder)

The holder 7 is made of an aluminum alloy which is cut in a predetermined shape. As shown in FIG. 2, the holder 7, which is made of a circular body provided with a rectangular ledge 7f that protrudes outward in the radial direction in a plan view. The holder 7 is provided with a cylindrical recess 7d with a bottom, whose center axis is L (FIGS. 1 and 2). The recess 7d has a diameter slightly smaller than the outer diameter of the top cover plate 3 and slightly larger than the outer diameters of the cylindrical body 2 and the bottom plate 1.

The holder 7 is provided with one general sector reference support post 7e and two general sector support posts 7a, which are spaced around the recess 7d at a substantially equi-angular distance with respect to the center axis L. The reference support post 7e is diametrically opposed to the ledge 7f with respect to the center axis L. The inner surface of the reference support post 7e lies in a tangent plane tangential to the cylindrical inner surface of the recess 7d in the tilt angle detection direction of the tilt sensor. The inner surfaces of the support posts 7a are defined by a cylindrical surface identical to the cylindrical surface of the recess 7d.

The reference support post 7e is provided on the inner surface thereof with an inner flange 7c having a flange surface 20 (upper surface in FIG. 1) perpendicular to the center axis L of the holder 7. The flange 7c projects toward the center axis L. The support posts 7a are provided on the upper ends thereof with stepped portions that are formed by cutting away inner surfaces of the support posts 7a with respect to the center axis L. The stepped surfaces 21 of the stepped portions and the flange surface 20 of the reference support post 7e lie in the same horizontal plane and form a support surface on which the top cover plate 3 fitted in the holder 7 is located.

The flange surface (upper surface) 20 of the inner flange 7c defines a planar engagement surface (positioning means) 22 which is adapted to determine the relative angular position of the top cover plate 3 with respect to the holder 7. Consequently, upon assembly of the tilt sensor, when the first indication plane 50 of the top cover plate 3 of the sealed container "A" is brought into close contact with the engagement surface 22, the angular position of the sealed container "A" is determined, and the upper electrodes 4 and 5 provided on the top cover plate 3 are juxtaposed in the tilt angle detection direction of the tilt sensor.

The radius of the bottom plate 1 of the sealed container "A" is such that the bottom plate 1 can be inserted in the recess 7d having the inner flange 7c. The radius of the top cover plate 3 is larger than the radius of the recess 7d. Consequently, when the sealed container "A" is moved downward in the gravitational direction while keeping the center axis of the sealed container coincident with the center axis L of the holder 7, the lower surface 1b of the bottom plate 1 is fitted in the recess 7d. The lower surface 3b of the top cover plate 3 abuts against the flange surface 20 and the stepped surfaces 21, so that the axial position thereof is determined.

The distance between the surface defined by the flange surface 20 and the stepped surface 21 and the bottom surface of the recess 7d is larger than the distance between the lower surface 3b of the top cover plate 3 and the lower surface 1b of the bottom plate 1 in the sealed container "A". Thus, the sealed container "A" is held by and hung from the holder 7 with the center axis thereof being coaxial to the center axis L of the holder 7. The upper surfaces of the reference support post 7e and support posts 7a lie in the same plane perpendicular to the center axis L, and are each provided with a threaded hole 7b which extends in the direction parallel with the center axis L. The outer peripheral surfaces of the reference support post 7e and support posts 7a define an identical cylindrical surface whose center is located on the center axis L. The diameter of the cylindrical surface defined by the reference support post 7e and support posts 7a is slightly reduced at the upper portions thereof.

As can be seen in FIGS. 1 and 3, the ledge 7f of the holder 7 is integrally provided with a rectangular mounting portion 10 which is bent downward (i.e., in the gravitational direction) at right angles to project from the distal end of the ledge 7f. The lower end of the mounting portion 10 is provided with two through holes 10a in which securing bolts 11 (FIG. 1) are inserted to secure the tilt sensor to an object to which the tilt sensor is mounted.

The mounting portion 10 extends in the tilt angle detection direction of the tilt sensor, i.e., in parallel with the engagement surface 22 of the reference support post 7e. The inner diameter of the through holes 10a is larger than the outer diameter of the shaft portions of the securing bolts 11, so that the tilt sensor can be slightly rotated about the axes of the bolts 11 in the plane of the sheet of the drawing (FIG. 1) with respect to the object in order to adjust the inclination angle of the tilt sensor when the tilt sensor is mounted to the object.

(Lid)

The lid 8 is made of an aluminum alloy disc which is cut to have such a diameter that the outer peripheral surfaces of the upper ends of the reference support post 7e and support posts 7a are circumscribed by a circle defined by the outer peripheral edge of the disc 8. The lid 8 is provided with spot facing holes 8c corresponding to the threaded holes 7b of the support posts 7a and 7e, so that when screws 13 with flat heads are screwed into the threaded holes 7b, the screw heads can be seated on the spot facing holes 8c. The lid 8 is provided on the lower surface thereof with an annular groove 8a whose diameter is slightly smaller than the outer diameter of the top cover plate 3 and whose center is located on the center axis L. An O-ring 12 is fitted in the annular groove 8a and is pressed against the top cover plate 3. The lid 8 is provided with-a central opening 8b through which the air bubble B within the sealed container "A" can be viewed from the outside.

(Cover)

Figure 9:
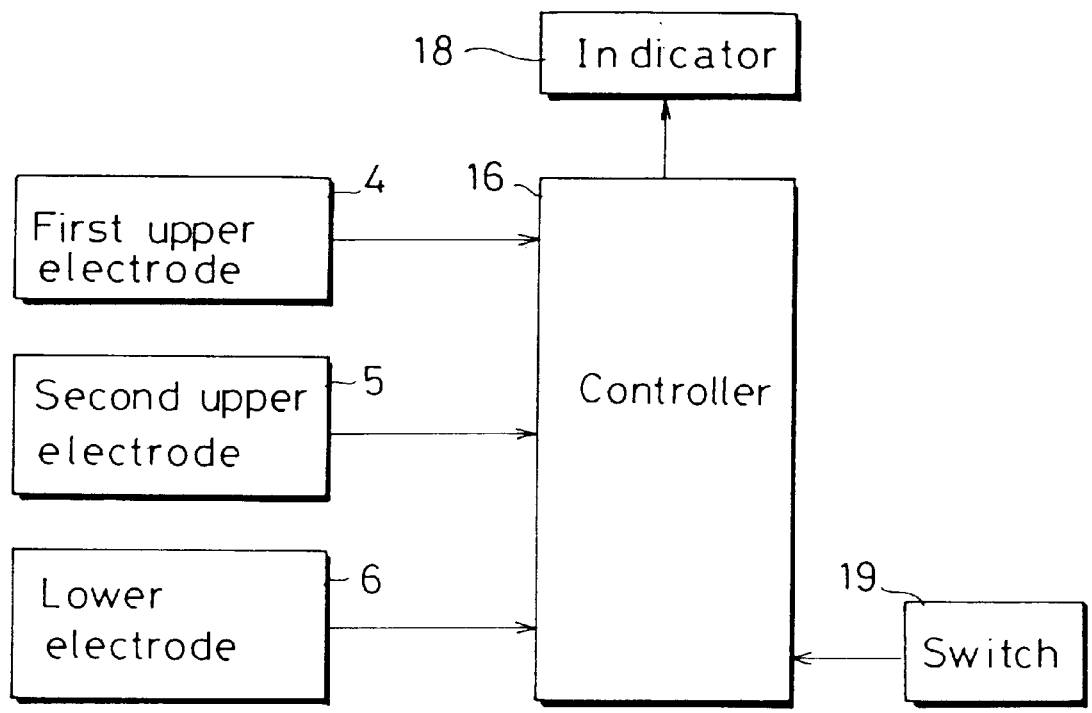
FIG. 9 is a block diagram of a tilt angle detection circuit connected to a tilt sensor shown in FIG. 1.

The cover 9 is made of an aluminum alloy which is cut into a cylinder whose one end is closed. The cover 9 is closely fitted onto the outer peripheral surfaces of the lower end portions of the support posts 7a and 7e without any clearance. The cover 9 prevents the sealed container "A" from being broken and from the entry of foreign matter thereinto to serve as a dust-proof member. Note that the cover 9 is provided on the end edge thereof with two cut-way portions through which the lead wires connected to the electrodes 4, 5, 6 extend to be connected to an external tilt angle detection circuit (FIG. 9).

Process of Formation of Tilt Sensor

To produce the tilt sensor, the top cover plate 3 of a lead glass mold, the cylindrical body 2 and the bottom plate 1 are prepared and polished appropriately, as mentioned above. The holder 7, the lid 8, and the cover 9 are prepared by cutting an aluminum alloy block into predetermined shapes.

The upper electrodes 4 and 5 are formed on the inner surface of the recess 3c of the top cover plate 3, as mentioned above. In the formation of the upper electrodes, the mask 30 (FIG. 6) is used to mask the portion of the lower surface 3b and the recess 3c of the top cover plate 3 other than those corresponding to the electrodes; and the coat holder 40 (FIG. 8) is used to hold the top cover plate 3a and the mask 30.

The mask 30 is formed by cutting a disk-like member into a predetermined shape having cut-away portions corresponding to the upper electrodes 4 and 5 and the projections 4a and 5a, as shown in FIGS. 6a and 6b. The outer peripheral surface of the mask 30 corresponds to the outer peripheral surface of the top cover plate 3. Namely, the mask 30 is made of a disc provided with openings (cut-away portions) 30a and 30b corresponding to the upper electrodes 4 and 5 and the projections 4a and 5a, and a second indication plane (second indication mark) 51 formed on the outer peripheral surface of the disc. consequently, when the top cover plate 3 and the mask 30 are superimposed so that the first indication plane 50 of the top cover plate 3 is registered with the second indication plane 51 of the mask 30, a predetermined relative positional relationship between the mask 30 and the top cover plate 3 is established.

The bridge portion 30c of the mask 30 which is provided between the cut-away portion 30a corresponding to-the first upper electrode 4 (4a) and the cut-away portion 30b corresponding to the first upper electrode 5 (5a) is located on the center axis of the top cover plate 3 at the bottom of the recess 3c extending in the direction y. As may be best seen in FIG. 6b, the bridge portion 30c is arched with a curvature identical to the curvature (radius of curvature=60 mm) of the recess 3c of the top cover plate 3 in the direction y, so that the bridge portion 30c can be stably held by the top cover plate 3.

Figure 7:
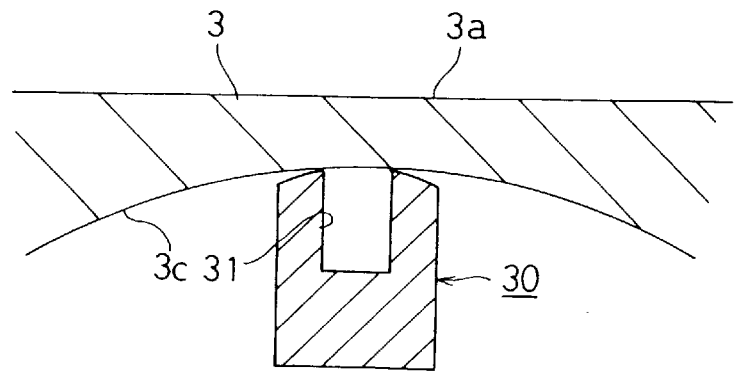
FIG. 7 is a sectional view of a mask and a recess of a top cover plate in a direction in which the tilt angle is detected.

The bridge portion 30c is provided with a longitudinal groove 31 extending along the longitudinal center axis thereof. The side edges of the longitudinal groove 31 come into line contact with the recess 3c of the top cover plate 3 when the mask 30 is superimposed on the top cover plate 3 without a clearance. Accordingly, during the formation of the electrodes, sticking platinum particles to the gap between the upper electrodes 4 and 5 on the recess 3c of the top cover plate 3 is prevented, as shown in FIG. 7.

As shown in FIG. 6a, the coat holder 40 which is generally cylindrical is provided with a fitting opening 40a in which the top cover plate 3 and the mask 30 are fitted, and a sputtering opening 40b through which platinum particles are sputtered.

The diameter of the fitting opening 40a of the coat holder 40 (fitting portion) corresponds to the diameter of the top cover plate 3 and the holder 30. Namely, the fitting opening 40a of the coat holder 40 is provided with a cylindrical portion corresponding to the cylindrical surfaces of the top cover plate 3 and the mask 30 and a planar reference surface portion (reference plane) 53 corresponding to the first indication plane 50 of the top cover plate 3 and the second indication plane 51 of the mask 30. Consequently, the top cover plate 3 and the mask 30 can be fitted in the coat holder 40 only when the first or second indication plane 50 or 51 is registered with the reference plane 53. In this state, the center axis of the coat holder 40 is identical to the center axis of the top cover plate 3 and the mask 30.

The coat holder 40 is provided with an annular stepped portion 43 between the fitting opening 40a and the sputtering opening 40b. The stepped portion 43 prevents the mask 30 and the top cover plate 3 fitted in the coat holder 40 from being dropped.

The coat holder 40 is provided with three pairs of upper and lower threaded holes 42 opposed to the reference plane 53. The threaded holes 42 radially extend through the coat holder 40. Securing screws (not shown) are screwed in the threaded holes 42 to immovably connect the top cover plate 3 and the mask 30 to the coat holder 40. Namely, when the screws (not shown) are screwed into the threaded holes 42 from the outside of the coat holder, the front ends of the screws are pressed against the cylindrical surfaces of the top cover plate 3 and the mask 30, so that the first indication plane 50 of the top cover plate 3 and the second indication plane 51 of the mask 30 are brought into close contact with the reference plane 53 of the coat holder 40 to thereby firmly hold the mask 30 and the top cover plate 3 in the coat holder 40. Thus, an appropriate relative relationship is established between the top cover plate 3 and the mask 30, held in the coat holder 40, thus resulting in no occurrence of an accidental relative movement therebetween during the formation of the electrodes.

Note that the coat holder 40 is provided on the inner peripheral surface thereof with two semi-cylindrical jig insertion grooves 41 which are diametrically opposed and which extend from the fitting opening 40a toward the platinum sputtering opening 40b. A Jig (not shown) is inserted in the jig insertion grooves 41 to remove the top cover plate 3 and the mask 30 from the coat holder 40 after the formation of the electrodes is completed.

Figure 8B:
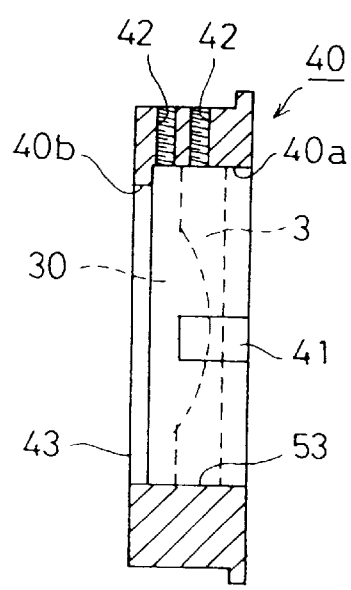
FIGS. 8a and 8b are a plan view of a coat holder which holds a top cover plate shown in FIG. 1 and a mask shown in FIG. 6, and a sectional view taken along the line VIIIb—VIIIb in FIG. 8a, respectively.
Figure 8A:
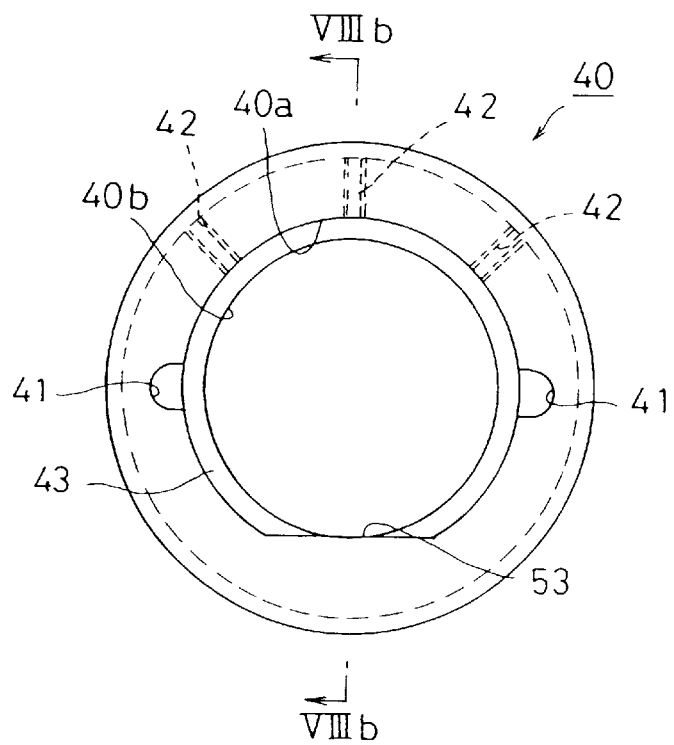

Upon formation of the electrodes, the mask 30 and the top cover plate 3 are fitted in the coat holder 40 so that the first or second indication plane 50 or 51 is registered with the reference plane 53. Namely, the mask 30 is first inserted in the fitting opening 40a of the coat holder 40, with the rear flat surface thereof facing the sputtering opening 40b. Thereafter, the top cover plate 3 is inserted in the coat holder 40 with the lower surface 3b thereof facing the mask 30. Consequently, the mask 30 and the top cover plate 3 are coaxially fitted in the coat holder 40. Namely, the axis of the mask 30 and the top cover plate 40 is aligned with the center axis of the coat holder 40. Since the peripheral edge of the mask 30 engages with the stepped portion (flange) 43 of the coat holder 40, no dropping of the mask 30 or the top cover plate 3 from the coat holder 40 occurs. Thus, the mask 30 and the top cover plate 3 are held in the coat holder 40, as can be seen in FIG. 8b.

Thereafter, the securing screws (not shown) are screwed into the threaded holes 42, so that the second indication plane 51 of the mask 30 and the first indication plane 50 of the top cover plate 3 are brought into close contact with the reference plane 53 of the coat holder 40. Thus, the second indication plane 51 of the mask 30 is flush with the first indication plane 50 of the top cover plate 3. Consequently, the mask 30 superimposed on the top cover plate 3 is set in a predetermined positional relationship to the top cover plate 3. Namely, the lower surface 3b of the top cover plate 3 is correctly masked by the mask 30.

The top cover plate 3 and the mask 30 held in the coat holder 40 are set in a high-frequency sputtering apparatus (not shown) in which the platinum thin layer is formed on the portion of the top cover plate 3 that is not masked by the mask 30 by the high-frequency sputtering. Thus, the upper electrodes 4 and 5 and the projections 4a and 5a are formed on the top cover plate 3.

The lower electrode 6 is formed on the lower surface 1a of the bottom plate 1, similarly to the formation of the upper electrodes.

Thereafter, the upper surface 1a of the bottom plate 1 and the lower surface 3b of the top cover plate 3 are coaxially adhered to the lower end surface and upper end surface of the cylindrical body 2 by means of an adhesive made of a glass paste, in a liquid-tight fashion, respectively. Thereafter, the electrolytic solution D is introduced in the cylindrical body 2 through an inlet port (not shown) formed in the side wall of the cylindrical body 2. After that, the inlet port is heat-sealed while an appropriate amount of air remains in the cylindrical body 2. The lead wires are soldered at their one end to the electrodes 4, 5 and 6. Thus, the sealed container "A" is obtained. Note that an air bubble B is formed in the sealed container "A" due to the interfacial tension between the inner surface of the recess 3c and the electrolytic solution D.

Thereafter, the sealed container "A" is inserted in the hollow portion of the holder 7 defined by the support posts 7a and 7e, while keeping the first indication plane 50 of the top cover plate 3 corresponding to and in close contact with the engaging surface 22 of the reference support post 7e of the holder 7. Consequently, the outer peripheral surface of the top cover plate 3 of the sealed container "A" is fitted in the hollow space defined by the engagement surface 22 of the reference support post 7e of the top cover plate 3 and the inner peripheral surfaces of the support posts 7a. As a result, the direction x in which the curvature of the recess 3c is smallest is identical to the tilt angle detection direction of the tilt sensor, and the lower surface 3b of the top cover plate 3 is stably held on the flange surface 20 of the reference support post 7e and the stepped surface portions 21 of the support posts 7a. Thus, the sealed container "A" is held in place and hung from the holder 7 in an appropriate posture.

Since the projections 4a and 5a of the upper electrodes 4 and 5 are located in the hollow portion defined between the reference support post 7e and the support posts 7a, the upper electrodes are isolated from the holder. Moreover, since the lower surface 3b of the top cover plate 3 is parallel with the tangent plane of the concave surface 3c at the deepest point thereof, when the axis L of the holder 7 extends in the vertical direction, the deepest point (center point) of the recess 3c is located in the highest position of the sealed container "A". Therefore, the air bubble B is moved to the deepest portion (center point) of the recess 3c.

Thereafter, the O-ring 12 is fitted in the annular groove 8a of the lid 8 and the holder 7 is covered by the lid 8. The spot facing holes 8c of the lid 8 are registered with the threaded holes 7b of the support posts 7a, and thereafter, the screws 13 with flat heads are screwed into the threaded holes 7b through the spot facing holes 8c. When the screws 13 are fastened to the extremity, the O-ring 12 is elastically deformed and is entirely pressed against the upper surface 3a of the top cover plate 3 to thereby press the top cover plate 3 onto the flanges 7c of the holder 7, regardless of the inclination angle of the upper surface 3a of the top cover plate 3. Consequently, the sealed container "A" is firmly connected to the holder 7 in the above-mentioned position. Thus, the tilt sensor is produced.

Tilt Angle Detection Circuit Connected to Tilt Sensor

The tilt angle detection circuit to detect the tilt angle by the tilt sensor will be discussed below with reference to FIG. 9.

In FIG. 9, a controller 16 which is connected to the electrodes 4, 5 and 6 through cords C is composed of a central processing unit CPU which performs the detection operation of the tilt angle of the sealed container "A". An indicator 18 is composed of a liquid crystal display LCD in which the tilt angle obtained by the controller 16 is displayed. A power switch 19 is actuated to supply the main electric power to the controller 16.

The controller 16 applies a pulse voltage between the upper electrodes 4, 5 and the lower electrode 6 when a main power is supplied thereto by the operation of the power switch 19. The value of a current flowing through the first upper electrode 4 and the value of current flowing through the second upper electrode 5 are measured and compared to obtain a ratio therebetween by the controller 16. The controller 16 calculates the tilt angle which is obtained by multiplying the current ratio by a predetermined constant. The tilt angle thus obtained is indicated in the LCD 18.

Operation of Tilt Sensor

The tilt sensor constructed as above operates as follows.

First of all, the tilt sensor is secured to an object to be measured. In the tilt sensor of the illustrated embodiment, the angular position of the sealed container "A" is adjusted to measure the inclination thereof along the direction parallel with the front (end) surface of the mounting portion 10. Therefore, if the subject to be measured is a box-like object, the mounting portion 10 is secured to a vertical surface of the object in the tilt angle detection direction by means of the screws 11. Since the diameter of the through holes 10a of the mounting portion 10 in which the screws 11 are inserted is larger than the outer diameter of the shaft portions of the screws 11, it is possible to slightly rotate the tilt sensor in a plane in which the mounting portion 10 lies to thereby make a horizontal surface of the object to be measured coincident with the horizontal surface of the tilt sensor (i.e., the surface perpendicular to the center axis L). This adjustment is carried out by an operator who observes the air bubble "B" within the sealed container "A" through the view window 8b of the lid 8. The adjustment is completed when the air bubble "B" is moved to the median portion of the upper electrodes 4 and 5. Upon completion of the adjustment, the cover 9 is placed on the holder 7 to cover the lid 8. The lead wires (not shown) are extended outside from the cut-away portions (not shown) of the cover 9 and are connected to the controller 16.

When the tilt sensor has been secured, the operator actuates the switch 19 to supply the drive power to the controller 16. Consequently, the controller 16 applies the voltage between the upper electrodes 4, 5 and the lower electrode 6 and measures the value of current flowing through the first upper electrode 4 and the value of current flowing through the second upper electrode 5, respectively to obtain a current ratio therebetween.

Since the resistance between the first upper electrode 4 and the lower electrode 6 and between the second upper electrode 5 and the lower electrode 6 varies in accordance with the contact surface area between the upper electrodes 4, 5 and the electrolytic solution D, the ratio of the values of current flowing through the first and second electrodes 4 and 5 varies. Namely, if the object to be measured is located horizontally in the detection direction, the air bubble "B" is in the median position between the upper electrodes 4 and 5 due to the adjustment mentioned above, and hence the resistance produced between the upper electrode 4 and the lower electrode 6 is identical to the resistance produced between the upper electrode 5 and the lower electrode 6. Accordingly, the values of current are identical. If the object to be measured is inclined in the detection direction, the air bubble "B" is moved toward the upper electrode 4 or 5. Consequently, the resistance produced between the upper electrode 4 and the lower electrode 6 is different from the resistance produced between the upper electrode 5 and the lower electrode 6. As a result, the values of current flowing through the upper electrodes 4 and 5 are different from each other.

The controller 16 calculates the tilt angle which is obtained by multiplying the current ratio thus obtained by a predetermined constant. The calculated tilt angle is indicated in the indicator 19. The controller 16 repeatedly and intermittently performs a series of operations including the application of the voltage and the indication of the tilt angle while the power supply is maintained by the operation of the switch 19.

As mentioned above, the mask 30 according to the present embodiment can be superimposed on the top cover plate 3 in a precise positional relationship therebetween. Consequently, not only can the man power necessary for the preparation of the upper electrodes 4 and 5 be reduced, but also a high quality of the sealed container can be maintained.

In addition, no relative movement between the top cover plate 3 and the mask 30, held by the coat holder 40 according to the present embodiment takes place during the formation of the electrodes. Consequently, the upper electrodes 4 and 5 can be precisely produced. Moreover, in the tilt sensor according to the present embodiment, when the sealed container "A" is inserted in the holder 7 while the first indication plane 50 of the top cover plate 3 is in register with the engagement plane 22, the sealed container "A" can be held by the holder 7 in a correct posture. Consequently, not only can the assembling operation of the tilt sensor can be simplified, but also a good quality of the tilt sensor can be maintained. In short, the productivity of tilt sensors can be increased.

Although the recess 3c of the top cover plate 3 is made of a toroidal surface in the illustrated embodiment, it is possible to make the recess 3c of a spherically concave surface.

As can be understood from the above discussion, according to the present invention, the sealed container can be precisely positioned with respect to and held by the holder. The mask according to the present invention can be superimposed on the top cover plate while keeping a correct positional relationship therebetween. In addition to the foregoing, according to the present invention, the coat holder can hold the top cover plate and the mask without causing any relative movement therebetween during the formation of the electrodes.

What is claimed is:

1. A tilt sensor for measuring an inclination angle of an object to which the tilt sensor is secured, the tilt sensor comprising:

a container body forming an enclosure holding a liquid containing an air bubble, said container body including a top cover plate adapted to close said enclosure of said container body, said top cover having a concave recess formed in a lower surface of said top cover plate opposing said enclosure, a depth of said concave recess gradually increasing from a peripheral edge of said top cover plate toward a center of said cover plate;

a holder which holds said container, said holder including a mounting portion for securing said holder to the object; and a positioning mechanism that registers said top cover plate and said holder with respect to each other in a predetermined relative angular relationship about an axis perpendicular to said lower surface of said top cover plate.

2. A tilt sensor according to claim 1, wherein said positioning mechanism comprises a non-cylindrical outer peripheral surface of said top cover plate and a fitting portion formed on said holder in which said non-cylindrical outer peripheral surface of the top cover plate is fitted.

3. A tilt sensor according to claim 2, said outer peripheral surface of said top cover plate comprising a planar surface portion and a cylindrical surface portion, and said fitting portion of said holder comprising an engaging flat surface with which said planar surface portion is engaged and an engaging cylindrical surface with which said cylindrical surface portion of said top cover plate is engaged.

4. A tilt sensor according to claim 1, wherein said concave recess is provided with two electrodes which are juxtaposed in a detection direction in which a tilt angle is detected by said tilt sensor.

5. A tilt sensor according to claim 3, wherein said concave recess is provided with two electrodes which are juxtaposed in a detection direction in which a tilt angle is detected by said tilt sensor.

6. A tilt sensor according to claim 5, wherein a direction of said planar surface portion of said top cover plate and said engaging flat surface of said holder coincide with said detection direction.

7. A tilt sensor according to claim 1, said holder comprising a supporting mechanism for supporting all of said container body by said lower surface of said top cover plate, whereby said container body is suspended within said holder with reference to said lower surface of said top cover plate.

8. A tilt sensor according to claim 7, said supporting mechanism comprising a flange that is farther from a bottom inner surface of said holder than a distance from said lower surface of said top cover plate to a lower external surface of said container body, for supporting all of said container body within said holder by said lower surface of said top cover plate.

9. A tilt sensor according to claim 1, in which said enclosure comprises a hollow cylindrical body and a lower plate affixed thereto, said top cover plate closing said hollow cylindrical body opposite said lower plate.

10. A tilt sensor according to claim 1, wherein said tilt sensor detects a direction in only one direction, and wherein said concave recess is curved in said only one direction.

11. A tilt sensor according to claim 10, wherein said mounting portion includes a mounting surface, and a direction of a mounting surface of said mounting portion of said holder further coincides with said detection direction.

* * * * *